US009215245B1

(12) United States Patent
Rajab et al.

(10) Patent No.: US 9,215,245 B1
(45) Date of Patent: Dec. 15, 2015

(54) EXPLORATION SYSTEM AND METHOD FOR ANALYZING BEHAVIOR OF BINARY EXECUTABLE PROGRAMS

(75) Inventors: Moheeb Abu Rajab, Santa Clara, CA (US); Xin Zhao, Palo Alto, CA (US); Niels Provos, Mountain View, CA (US)

(73) Assignee: Google Inc., Mountain View, CA (US)

( * ) Notice: Subject to any disclaimer, the term of this patent is extended or adjusted under 35 U.S.C. 154(b) by 163 days.

(21) Appl. No.: 13/593,064

(22) Filed: Aug. 23, 2012

Related U.S. Application Data

(60) Provisional application No. 61/558,351, filed on Nov. 10, 2011.

(51) Int. Cl.
| | |
|---|---|
| H04L 29/06 | (2006.01) |
| G06F 21/56 | (2013.01) |
| G06F 21/57 | (2013.01) |
| G06F 21/55 | (2013.01) |
| G06F 21/50 | (2013.01) |

(52) U.S. Cl.
CPC ............ H04L 63/1433 (2013.01); G06F 21/50 (2013.01); G06F 21/552 (2013.01); G06F 21/56 (2013.01); G06F 21/57 (2013.01); G06F 21/577 (2013.01); H04L 63/145 (2013.01); H04L 63/1491 (2013.01)

(58) Field of Classification Search
CPC .............. H04L 63/1433; H04L 63/145; H04L 63/1491; G06F 21/50; G06F 21/552; G06F 21/56; G06F 21/57; G06F 21/577
See application file for complete search history.

(56) References Cited

U.S. PATENT DOCUMENTS

| | | | |
|---|---|---|---|
| 7,234,165 B1 | 6/2007 | Hursey et al. | |
| 7,480,683 B2 | 1/2009 | Thomas et al. | |
| 8,019,700 B2* | 9/2011 | Provos et al. | 706/12 |
| 8,126,866 B1* | 2/2012 | Barton et al. | 707/706 |
| 8,515,896 B2* | 8/2013 | Zhou et al. | 706/62 |
| 8,613,080 B2* | 12/2013 | Wysopal et al. | 726/19 |
| 2003/0188194 A1* | 10/2003 | Currie et al. | 713/201 |
| 2006/0085854 A1* | 4/2006 | Agrawal et al. | 726/23 |
| 2007/0118903 A1* | 5/2007 | Bates et al. | 726/22 |
| 2008/0133208 A1* | 6/2008 | Stringham | 703/20 |

(Continued)

OTHER PUBLICATIONS

Tsern-Huei Lee, "Generalized Aho-Corasick Algorithm for Signature Based Anti-Virus Applications", Aug. 13-16, 2007 IEEE, Proceedings of 16th International Conference on Computer Communications and Networks, 2007, pp. 792-797.

*Primary Examiner* — Michael Pyzocha
(74) *Attorney, Agent, or Firm* — Fox Rothschild LLP

(57) ABSTRACT

Systems and methods for automatically analyzing and predicting behavior of binary executable programs are provided. A virtual machine receives a URL or content based feature corresponding to a binary executable program and the virtual machine analyzes the behavior of the binary executable program. The safety information of the binary executable program is determined based on the analysis report generated by the virtual machine and its impact on the virtual machine. A binary explorer selects a URL or content based feature corresponding to the binary executable program to be analyzed. A binary analyzer automatically records the behavior of the binary executable program to generate a report containing safety information describing the interaction occurred between the binary executable program and the analysis virtual machine. A result interpreter determines and predicts whether the binary executable program is safe based on the information generated by the binary analyzer.

18 Claims, 7 Drawing Sheets

(56) References Cited

U.S. PATENT DOCUMENTS

| | | | |
|---|---|---|---|
| 2009/0089879 A1* | 4/2009 | Wang et al. | 726/24 |
| 2011/0067105 A1* | 3/2011 | Wolfe et al. | 726/23 |
| 2011/0185428 A1* | 7/2011 | Sallam | 726/24 |
| 2012/0017281 A1* | 1/2012 | Banerjee et al. | 726/25 |
| 2012/0066680 A1* | 3/2012 | Amano et al. | 718/1 |
| 2012/0144492 A1* | 6/2012 | Griffin et al. | 726/25 |
| 2012/0304244 A1* | 11/2012 | Xie et al. | 726/1 |
| 2013/0086684 A1* | 4/2013 | Mohler | 726/24 |
| 2013/0097706 A1* | 4/2013 | Titonis et al. | 726/24 |
| 2013/0347094 A1* | 12/2013 | Bettini et al. | 726/11 |
| 2014/0201806 A1* | 7/2014 | Kumar | 726/1 |

* cited by examiner

EXPLORATION SYSTEM AND METHOD FOR ANALYZING BEHAVIOR OF BINARY EXECUTABLE PROGRAMS

CROSS REFERENCE TO RELATED APPLICATION

This patent application claims the benefit of U.S. Provisional Patent Application No. 61/558,351, filed Nov. 10, 2011, entitled "Exploration System And Method For Analyzing Behavior of Binary Executable Programs" which is incorporated herein by reference in its entirety.

BACKGROUND

1. Field

The embodiments generally relate to security in a computing environment.

2. Background Art

Wide area computer networks, such as the Internet, are replete with deceptive executable content that adversely impacts both user experience and company revenues. This deceptive executable content may include deceptive binary executable programs, such as malware, spyware and adware that can be found in the websites that host free downloads. Instead of attempting to exploit vulnerabilities on the users' computer system, the deceptive binary executable programs may use social engineering to entice users to download and run the malicious content.

Malware is essentially a hostile or intrusive executable program designed to disrupt or deny operation, steal information leading to loss of privacy, gain unauthorized access to system resources or perform other abusive behavior.

Executable programs such as spyware record users' keystrokes, web surfing habits and send the information to interested parties without knowledge of the users. As a result, private information such as login names, passwords and credit card numbers are susceptible to theft, imposing security risk to both individual users and organizations as a whole.

Adware is another type of executable program that displays advertising banners on web browsers, which creates undesirable effects on a system, such as overlaying spam advertisements and causing degradation in system performance. Indeed, adware is often installed in tandem with spyware. Accordingly, both programs feed off each other's functionalities: spyware programs profile users' interne behavior, while adware programs display targeted ads corresponding to the gathered user profile to monetize the control over infected systems.

Different efforts have been made to identify and remove malware. One approach has focused on using "signatures" or "heuristics" to detect and identify specific malware. These signatures or heuristics may be characteristics such as a bit pattern unique to a type of malware. In this approach, anti-malware performs a scan by examining the user's computer system for matching malware signatures. When matches indicative of the presence of malware are found, the anti-malware may quarantine or remove the infected files. This conventional approach is limited, however, as it only detects malware after a system is already infected by deceptive executable content. In addition, the scanning process is computationally expensive and lacks behavioral analysis of the infected system. As a result, implications of the presence of deceptive executable content either at the user level or enterprise level remain unknown.

BRIEF SUMMARY

Embodiments relate to automatically analyzing and predicting deceptive behavior of executable content including deceptive binary executable programs. In an embodiment, a URL or content based feature of a binary executable program is received by an analysis virtual machine. The analysis virtual machine can in turn automatically analyze the behavior of the binary executable program to generate an analysis report containing the safety information associated with the binary executable program. Accordingly, it can be determined whether the binary executable program is safe by using the safety information generated by the analysis virtual machine.

In another embodiment, a system for automatically analyzing and predicting behavior of a binary executable program includes a binary explorer, a binary analyzer, and a result interpreter. The binary explorer is configured to receive a URL or content based feature of the binary executable program to be analyzed. The binary analyzer is configured to automatically analyze the behavior of the binary executable program to generate a report containing safety information associated with the binary executable program. A result interpreter is configured to determine whether the binary executable program is safe based on the information generated by the binary analyzer. Furthermore, the result interpreter can predict the behavior of a binary executable program based on a comparison of the binary executable program a user invokes and known executable programs in a binary database.

Further embodiments, features, and advantages of the present invention, as well as the structure and operation of the various embodiments, are described in detail below with reference to the accompanying drawings. It is noted that the invention is not limited to the specific embodiments described in this application. Such embodiments are presented for illustrative purposes only. Additional embodiments will be apparent to persons skilled in the relevant art(s) based on the information contained in this document.

BRIEF DESCRIPTION OF THE DRAWINGS/FIGURES

Embodiments are described, by way of example only, with reference to the accompanying drawings. In the drawings, like reference numbers may indicate identical or functional similar elements. The drawing in which an element first appears is typically indicated by the leftmost digit or digits in the corresponding reference number.

Figure 1:
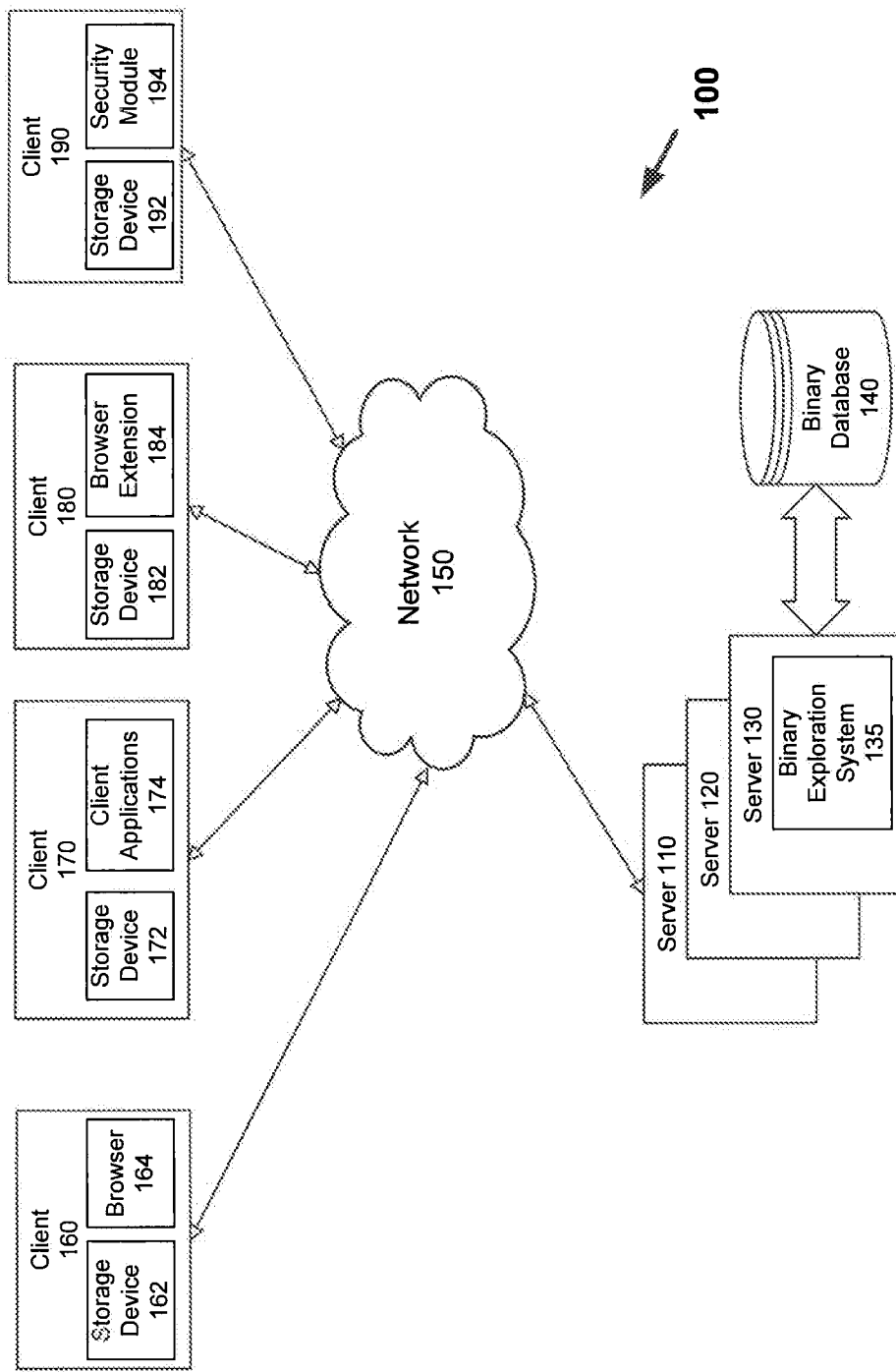
FIG. 1 is a diagram illustrating a distributed system suitable for practicing an embodiment of a binary exploration system.

The accompanying drawings, which are incorporated herein and form part of the specification, illustrate the embodiments of the present invention and, together with the description, further serve to explain the principles of embodi-

DETAILED DESCRIPTION

Table of Contents

Binary Exploration System in Distributed Computer Network
  Examples of Binary Explorer
  Examples of Binary Analyzer
  Binary Program Testers
  Method
  Example Computer System Implementation
  Variations
  Conclusion Embodiments relate to automatically analyzing and predicting behavior of executable programs transmitted between computers. Embodiments may be implemented on one or more computer systems or other processing systems using hardware, firmware, software, or a combination thereof.

As will be described in further detail below, embodiments can protect users against deceptive content that adversely impact the users' browsing experience and general performance of their computer systems.

As will be described in further detail below, embodiments can enable enterprises to better understand the overall impact of deceptive content at the enterprise level and develop strategies to cope with the situation.

As will be described in further detail below, embodiments can provide a tool to evaluate browser extensions from a third party and address the related security concerns.

As will be described in further detail below, embodiments can investigate executable programs of interest observed in a corporate network. Embodiments can be further adapted to determine applications developed from partners that are required to comply with an enterprise's application guidelines.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Binary Exploration System in Distributed Computer Network

As shown in FIG. 1, in one embodiment, a distributed system 100 includes servers 110, 120, and 130, a binary exploration system 135, a binary database 140, a network 150, and clients 160, 170, 180 and 190.

Clients 160, 170, 180 and 190 communicate with one or more servers 110, 120 and 130 over the network 150. The number of clients 160-190 and servers 110-130 is illustrative and not intended to be limiting as fewer or larger numbers of clients or servers may be used. Network 150 may be any network or combination of networks that carry data communication. Such network can include, but is not limited to, a local area network, medium area network, or wide area network such as the Internet.

According to an embodiment, client 160 includes a storage device 162 and a browser 164. Browser 164 may be any application software or program designed to enable users to access, retrieve, and view documents and other resources on the Internet. For example, browser 164 can be a web browser. In another embodiment, client 170 includes a storage device 172 and a client application 174. Client application 174 may be any application developed by a partner of an organization that subjects to the compliance requirement of certain guidelines of the organization. In a further embodiment, client 180 includes a storage device 182 and a browser extension 184, which may encompass plug-ins or add-ons that supplement functionalities of the browser and enhance the user interface in a way that is not directly related to the viewable content of web pages. In still another embodiment, client 190 includes a storage device 192 and a security module 194 residing in a corporate network. Security module 194 may access or contain binaries of interest to be analyzed and evaluated by system 100.

Storage devices 162, 172, 182 and 192, may, for example, be a removable storage device 714, which will be described in detail in FIG. 7. They may comprise a floppy disk drive, a magnetic tape drive, an optical disk drive, a flash memory, or the like.

In this embodiment, one or more of servers 110, 120 and 130 can host binary exploration system 135. As illustrated in FIG. 1, clients 160, 170, 180 and 190 can send data requests to servers 110, 120 and 130, which can in turn invoke binary exploration system 135 for further processing. When binary exploration system 135 identifies binary executable programs (also called "binaries") contained in the data requests as a new entry which has not been previously examined by system 100, binary exploration system 135 may then analyze and predict the behavior of the identified binaries accordingly. The analysis report and testing result generated by system 135 can be stored in binary database 140.

Alternatively, when a data request is forwarded to binary exploration system 135, it may identify the binaries of interests and query binary database 140 to find a match with a pre-existing list of harmful URLs. If a match is found, the relevant analysis report associated with the binaries can be presented to a user.

Binary exploration system 135 can be software, firmware, or hardware or any combination thereof in a computing device. System 100 can be implemented on or implemented with one or more computing devices. A computing device can be any type of computing device having one or more processors and memory. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s). A further example of a computing device is described with respect to FIG. 7 below.

Figure 2:
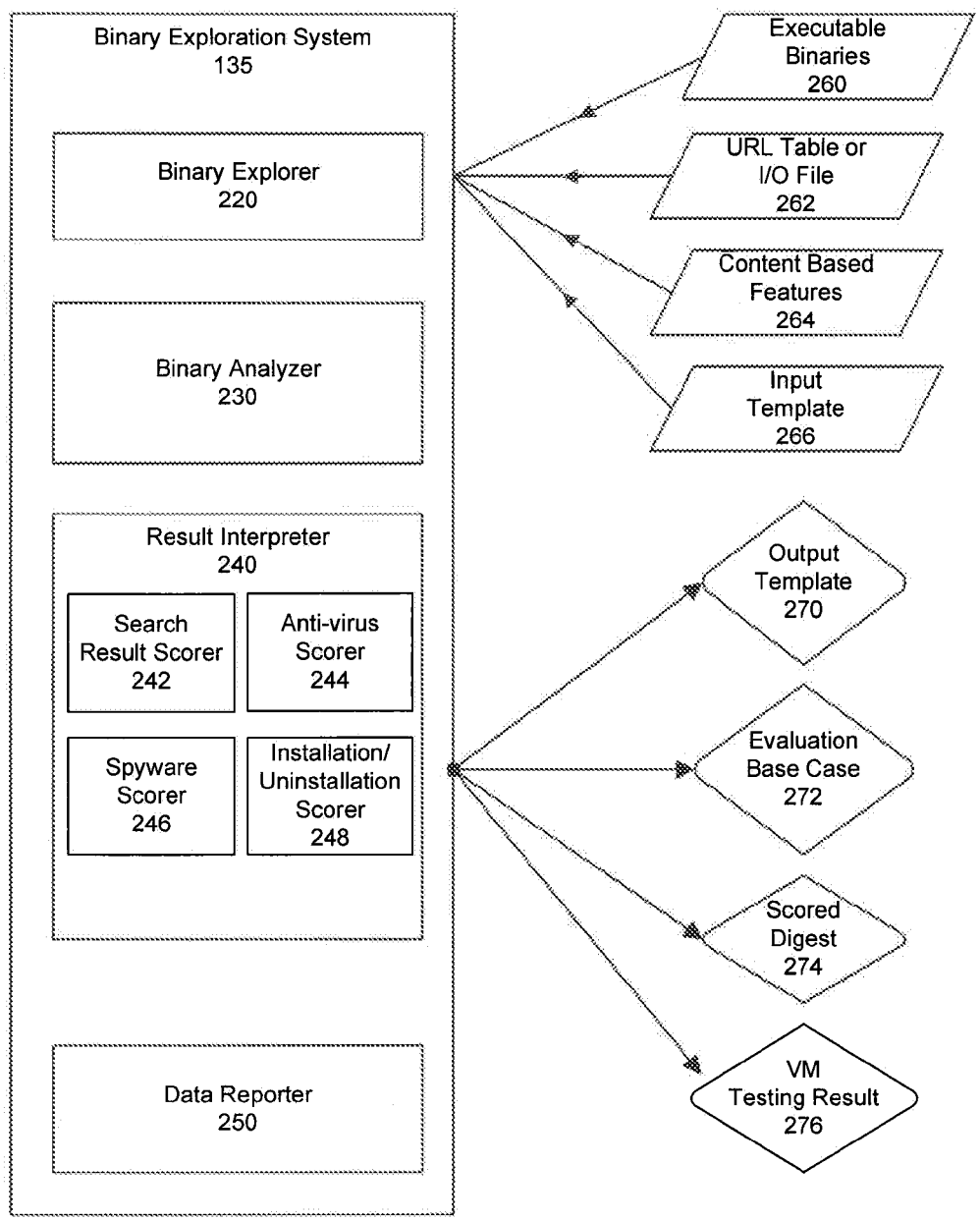
FIG. 2 illustrates elements of the binary exploration system for automatically analyzing and predicting behavior of binary executable programs, according to an embodiment.

FIG. 2 illustrates elements of a binary exploration system 135 for automatically analyzing and predicating behavior of binary executable programs, according to an embodiment. In the example shown in FIG. 2, binary exploration system 135 includes binary explorer 220, binary analyzer 230, result interpreter 240, and data reporter 250. Binary exploration system 135 may take input data such as executable binaries 260, URLs contained in URL table or I/O file 262, content based features 264, and input template 266. Likewise, binary exploration system 135 may generate output data such as output template 270, evaluation base case 272, scored digest 274, and VM test result 276.

According to an embodiment, binary explorer 220 may explore and fetch candidate binaries of interest for analysis. Binary analyzer 230 may accept and analyze the input binaries transmitted from binary explorer 220 to identify potential deceptive and undesirable behavior. Binary explorer 220 and binary analyzer 230 will be described in detail in FIG. 4 and FIG. 3 respectively.

Figure 3:
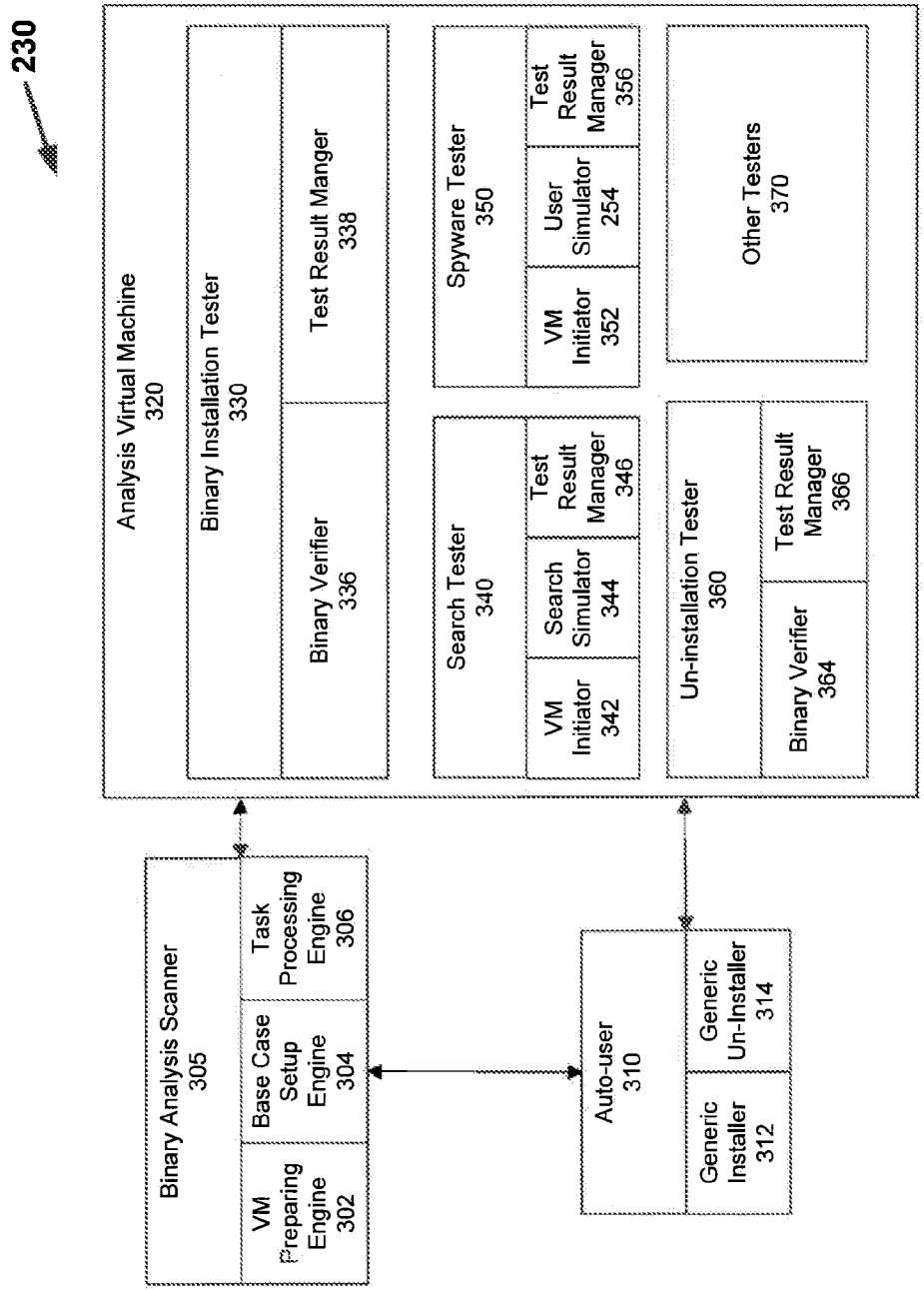
FIG. 3 illustrates elements of the binary analyzer, according to an embodiment.

Based on the analysis result generated by binary analyzer 230, result interpreter 240 can compare the analysis result with the base case data of the analysis VM 320 in FIG. 3, score and interpret the analysis result accordingly. Virtual machine (VM) or analysis VM may be an isolated guest operating system installation within a normal host operating system. A virtual machine may be implemented with either software emulation or hardware virtualization. It may provide a platform-independent programming environment that abstracts away details of the underlying hardware or operating system, and allows a program to execute in the same way on any platform. Therefore, a potential harmful binary executable program can be isolated and studies in the virtual machine without impacting functionalities outside the virtual machine.

Safety information of a binary executable program may be any parameter recorded on a virtual machine indicating the behavior of the binary executable program after its installation to the virtual machine. For example, the binary executable program may change system wide preferences such as a browser's homepage, default search engine, Domain Name System (DNS) server or proxy settings. Alternatively, the binary executable program may attempt to disable already running processes or services such as system processes, security software etc. In another example, the binary executable program may replace or overwrite system library or DLL files. In still another example, the binary executable program may change network settings to open backdoors for the offending program, or conduct a scanning activity. Therefore, the safety information may record all the information mentioned above. However, the examples referenced above are for the purpose of illustration only and not for limitation.

In an embodiment, result interpreter 240 includes a scorer, that scores the analysis result by comparison with the replay base case for changes on the analysis VM such as the file system, registry, process changes, or changes on HTML or Document Object Model (DOM) on the webpage for content injection. The scorer can comprise a search result scorer 242, anti-virus scorer 244, spyware scorer 246, installation/un-installation scorer 248, corresponding to the distinct functionalities of VM analyzer 320, which will be discussed in detail in FIG. 3. The analyzed and scored result called scored digests 274, can be stored in binary database 140 for future reference by data reporter 250.

Finally, data reporter 250 can examine a URL link a user requests and trigger a warning message associated with the scored digest 274, if there is a match between the requested URL and a corresponding entry in a URL table 262 or URL list file 264. In this way, a user is warned of a deceptive binary executable program before the deceptive binary executable program is loaded onto a user's computer.

Examples of Binary Explorer

Figure 4:
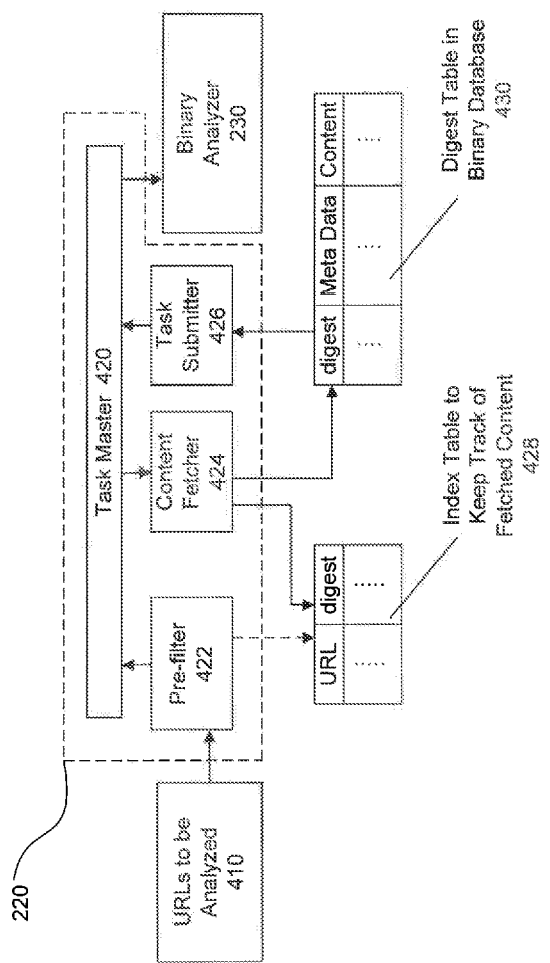
FIG. 4 illustrates the interaction of elements of the binary explorer, according to an embodiment.

FIG. 4 illustrates the interaction of elements of binary explorer 220, according to an embodiment. In this example, task master 420 manages all tasks submitted to and processed by binary explorer 220.

Binary explorer 220 initiates the exploration phase of the tasks by taking URLs of interest 410 as input to be processed by pre-filter 422. For example, URLs of interest 410 can come from an I/O file containing all the URL links crawled by a search engine. In an alternative, URLs of interest 410 can be records updated and stored in binary database 140. Furthermore, the source data can also be provided by other URL based inspection infrastructure, such as any anti-virus, anti-malware sites, fake anti-virus sites, anti-phishing sites and pagerank services.

Pre-filter 422 subsequently filters input URLs to extract candidate URLs that are likely to be associated with binary downloads. In an example, URL content based features such as file extension and downloading tokens are examined for possible indication of binary downloads. It is worth noting that, file extensions can include, but are not limited to .exe files, .cab files, .msi files, .ocx files, .dll files, zip files and rar files, which are all potential files associated with binary downloads.

The output of pre-filter 422 can generate tasks to be fetched by content fetcher 424 for further processing. The functions of Pre-filter 422 can be at least three folds. In some embodiments, pre-filter 422 can act as a rate limiter to restrict the number of the URLs submitted to content fetcher 424. In other embodiments, pre-filter 422 can prioritize the URLs to be submitted according to the importance of the websites that the URLs representing based on some weighing algorithms. In still other embodiments, the URLs can be prioritized based on trends, search queries or traffic info.

According to an embodiment, pre-filter 422 can consult the entries in binary database 140 or I/O files for a pre-existing list of harmful URLs. Only after pre-filter 422 fails to find a corresponding entry, the binary can be considered a newly downloaded binary and the task can be submitted to content fetcher 424 for processing. On the contrary, for binaries that already exist in binary database 140, the task will not be fetched by content fetcher 424. Instead, such binaries can be stored in binary database 140 with new timestamps. For example, the binaries can be stored in binary database 140 keyed by their digests in the format of: key:<digest>:timestamp content:<bytes> MetaData {string url, string source}.

Referring back to FIG. 2, content fetcher 424 can receive tasks posted by pre-filter 422 and fetch content from the Internet, which is stored as a digest corresponding to a URL in binary database 140. In addition, as described in table 428, the URL/digest table can be indexed for easy access of recently fetched URLs. Thus, content fetcher 424 can generate a digest table 430 containing the digests, their associated metadata and content as an output, which can be eventually stored in binary database 140.

Task submitter 426 can in turn read the newly fetched digests. In some embodiments, task submitter 426 can prioritize the content to be fetched according to the digest metadata. Consequently, task submitter 426 can conclude the exploration phase and post the tasks to binary analyzer 230.

Examples of Binary Analyzer

FIG. 3 illustrates elements of binary analyzer 230, according to an embodiment. In this embodiment, binary analyzer 230 can include binary analysis scanner 305, auto-user 310, and analysis virtual machine 320.

Because binary analyzer 230 can also get its tasks from a task queue, it can initiate analysis phase of the tasks by receiving incoming tasks from binary explorer 220, fetching content from digest table 430 and submitting the fetched content to binary analysis scanner 305, as will be described in further detail below.

Binary analysis scanner 305 can include VM preparing engine 302, base case setup engine 304, and task processing engine 306, which will be described in detail in FIG. 5.

Auto-user 310 can be used to simulate user interaction with window dialogs and components of HTML pages on a website. In some embodiments, auto-user 310 can be used to facilitate automatic installation of a binary to the VM and simulation of the user interaction with the VM. In other embodiments, auto-user 310 can be developed as a windows module. In still other embodiments, auto-user 310 can include two components depending on the functionality of the components: windows component to interact with native windows and dialogs; and HTML component to interact with HTML pages.

The windows component, which is designed to support auto-installation of a binary to VM that requires user interaction, can encompass the following functionalities. First, the windows component can derive interaction via well-defined steps provided in a config file. For example, this component can be used to install well known installers such as plugins. In addition, it can act as a generic auto-installers to install unknown binaries, which also can include a dialog clicker to intercept window creation events and interact with dialogs to emulate user interactions following heuristics of common structure of existing installers.

This dialog clicker can be implemented as a stateless module, which can inspect the text on all interactive windows or dialog boxes. Further, the dialog clicker can click on common buttons that are likely to make a transition forward, such as "yes," "install," and "next" button. In the cases of radio buttons, the clicker can toggle their state and monitor the impact on the dialog window. Accordingly, the clicker can proceed with clicks until no more dialog is generated.

On the other hand, the HTML component, which is designed to simulate user interaction with HTML web pages, can be used in the various testers of analysis VM 320, as will be described in detail below.

Binary Program Testers

Turning to analysis VM 320, which can be used to explore various behaviors of the binaries and their impact on user experience and enterprise system, can comprise binary installation tester 330, search tester 340, spyware tester 350, and un-installation tester 360, and other testers 370 such as click-fraud tester and rootkit tester.

According to an embodiment, binary installation tester 330 includes binary verifier 336 and test result manager 338, whose functions will be described in detail in FIG. 5. Search tester 340 can include VM initiator 342, search simulator 344, and test result manager 346. Likewise, spyware tester 350 can comprise VM initiator 352, user simulator 354, and test result manager 356. Similar to binary installation tester 330, un-installation tester 360 can encompass binary verifier 364 and test result manager 366. All internal components of the testers will be discussed in detail in FIG. 5.

It is worth noting that, test result manager of each tester on analysis VM 320 can store the result of the analysis in a corresponding protocol buffer with information relating to changes on analysis VM 320 as a result from installing and running the binaries. In addition, each test result manager can record functionalities specific to that tester in the corresponding protocol buffer. The following is an example code snippet of protocol buffer definition for a tester storing information such as changes on file/registry/window/process monitors, HTML content, and network responses.

```
message Evaluation {
    bytes digest;
    bytes source;
    repeated message TestResult;
    message tableInfo replaycell;
}
message TestResult {
    string name;
    message ResultVM vm_results;
    message MessageSet tester_result; // Tester Specific Analysis Results
}
message VMResult {
    repeated FileLog file_log;
    repeated RegistryLog registry_log;
    repeated Process process_log;
    repeated SocketLog socket_log;
    repeated MemoryLog memory_log;
    repeated MutexLog mutex_log;
    repeated HTTPRequestResponse http_requests;
    repeated ResponserSession responder_sessions;
    repeated ScreenShots screenshots;
    repeated DroppedFile new_content;
    repeated Errors errors;
}
message Error {
    // can be enum with ids
    bytes name;
    repeated string infos;
}
message ResponderSession {
    required string appproto = 1;    // SMTP, IRC, FTP, UNKNOWN
    required string netinfo = 2;     // original src/dst IP/port
    repeated bytes messages = 3;     // requests/responses (in order)
    repeated bytes metadata = 4;     // protocol-specific data (e.g., email msgs)
    optional string meta_proto = 5;  // set when a non-standard port is used
}
//
// HTTP request and corresponding response.
//
message HTTPRequestResponse {
    required int64 timestamp = 1;  // Request start timestamp (seconds from epoch)
    required int32 number = 2;
    required HTTPRequest request = 3;   // Original request
    required HTTPResponse response = 4;
    optional int64 response_timestamp = 5;
}
message HTTPHeader {
    required bytes name = 1;
    required bytes value = 2;
{
message HTTPRequest {
    required group FirstLine = 1 {
        required bytes verb = 2;
        required bytes uri = 3;
        required bytes version = 4;
    };
```

```
        repeated HTTPHeader headers = 5;
        optional bytes body = 6;
        optional bytes bodydigest = 7;
        optional int32 bodylength = 8;
    }
message HTTPResponse {
    required group FirstLine = 1 {
        required bytes code = 2;
        required bytes message = 3;
        required bytes version = 4;
    };
    repeated HTTPHeader headers = 5;
    optional bytes body = 6;
    optional bytes bodydigest = 7;
    optional int32 bodylength = 8;
}
message ScreenShot {
    enum FORMAT {
        JPEG = 0;
        PNG = 1;
    }
    required FORMAT format = 1;
    optional int64 timestamp = 2;    // Seconds since epoch.
    optional string label = 3;       // Label descripting the image.
    required bytes digest = 4;
    optional bytes content = 5;      // the content can be stored in a
different DB column.
}
```

Figure 5:
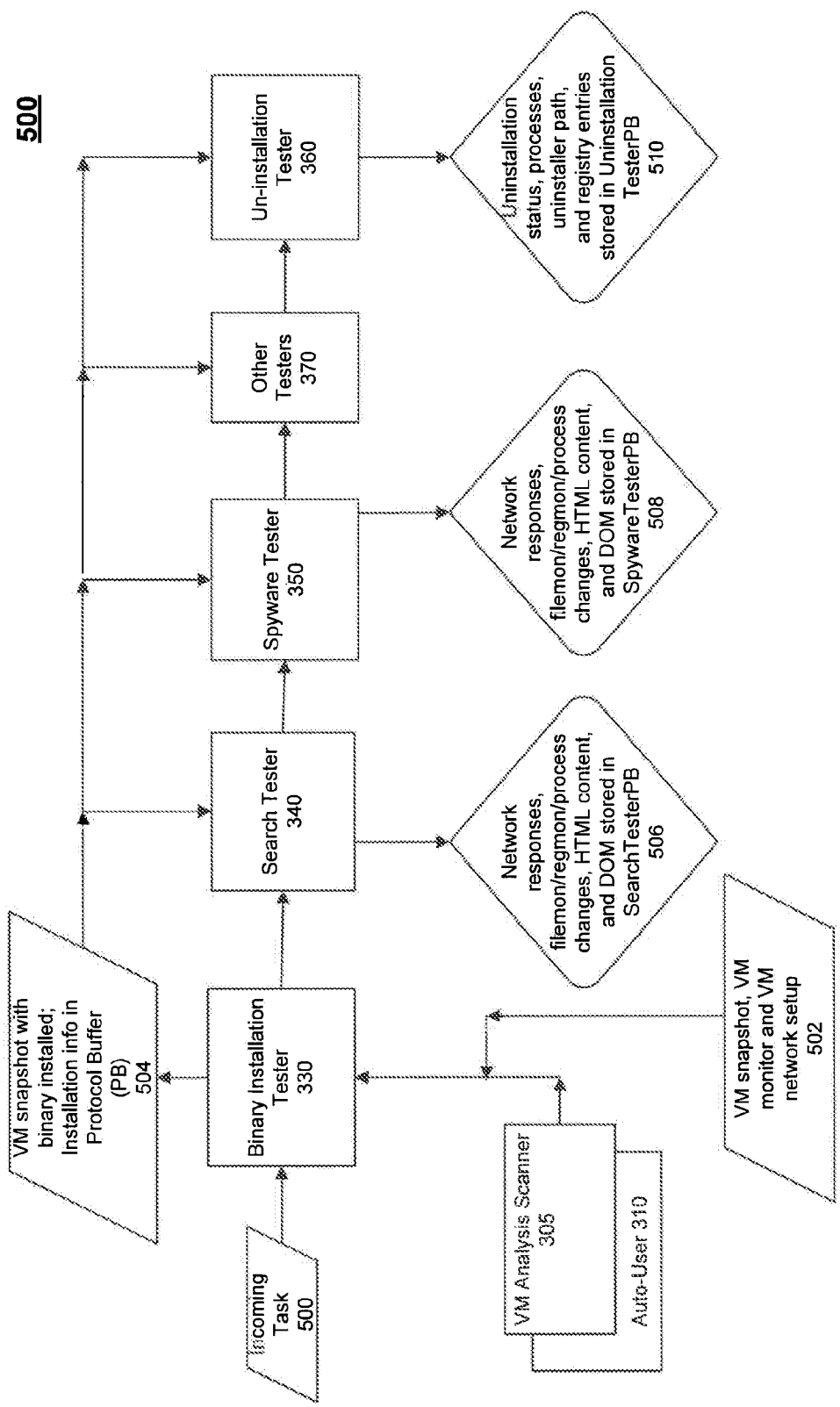
FIG. 5 illustrates data flow among elements of the binary analyzer, according to an embodiment.

FIG. 5 illustrates the interaction of elements of binary analyzer 230, according to an embodiment. As described in FIG. 3, the binary analysis phase starts with binary analysis scanner 305 preparing the VM for accepting the incoming tasks via its VM preparing engine 302. In some embodiments, VM preparing engine 302 can run a one-time setup, including setting up monitors and networking, and taking snapshot of the VM to be used as images in processing subsequent tasks. In other embodiments, setting up the image can be implemented by a separate engine.

Following the workflow in VM analysis scanner 305, in the next step, base case setup engine 304 can load a base case of the VM for each incoming task, including images of the VM from a clean run of each tester without any binary installed. In some examples, the base case can provide a way to replay the network content of each tester. In other examples, the base case can be used as a validation baseline and benchmark by result interpreter 240. Due to the fact that the base case can be reused across multiple tasks, the base case can be generated once or periodically to incorporate any change if necessary. Furthermore, the output of the base case called replay base case can be stored in binary database 140.

Binary analyzer 230 can proceed to task processing engine 306 to initiate and prepare testers 330, 340, 350, 360 and 370. For each incoming task associated with a specific digest, engine 306 can retrieve the content corresponding to the digest from binary database 140. Task processing engine 306 can further select appropriate tester according to the task requirements, manage the tasks running through each tester, aggregate the result in the binary analysis phase, interpret error messages and manage workflow upon failure of a specific tester.

Next, the binary analysis phase can invoke binary installation tester 330 to automatically install and run the binary on the VM. In some embodiments, auto-user 310 can provide a generic installer 312 to simulate user actions and facilitate binary download and installation. In this example, generic installer 312 can install the binaries in the form of executable files (such as .ocx, .dll and .exe files), and distribution unit CAB files. In an alternative, generic installer 312 can run a binary of stand-alone executable via command line prompt.

After the binaries are installed, binary verifier 336 can inspect for the new processes and monitor file system and registry changes to find the location of the newly installed binaries. Eventually, test result manager 338 can take a snapshot of the VM, store the installation related information in a protocol buffer and call the next binary analysis tester. Below is an example code snippet of protocol buffer definition for binary installation tester 330:

```
    message InstallationTesterResult {
        enum Status {
            SUCCESS;
            FAIL;
        }
        required Status status;
        repeated string error_messages;
        // stores information on any windows created and any
            actions
        taken on
        them.
        repeated message Window windows;
        repeated message InstallationInfo info;
    }
    message InstallationInfo {
        repeated string processes;
        repeated string installer_path;
        repeated string program_path;
        repeated string registry_entries;
    }
    // a single window action step
    message Window {
        // unique string for each type of window
        required string id;
        optional string window_title;
        optional string window_text;
        // Window Components and actions on them (if existed)
        repeated message WindowComponent components=2;
        // useful for manual inspection if the installer fails.
        optional message ScreenShot screenshot=4;
    }
// potentially reuse the same definition from mawler.proto
message ScreenShot {
    enum FORMAT {
        JPEG=0;
    }
    required FORMAT format;
    required int64 timestamp;
    optional string label;
    optional message<ScreenView> view;
    required string digest; // we store the actual content in a
separate
column.
}
    message WindowComponent {
        enum ComponentType {
        Button;
        Title;
        RadioButton;
        Checkbox;
        MenuItem;
        Listbox;
        Others;
        }
        required ComponentType type;
        required string label; // (e.g., text label of the component)
        // The operations done on this window component.
        // There could be multiple operations, usually in a certain
order.
```

```
repeated message WindowAction actions=3;
}
// What action we took for this window
    message WindowAction {
    enum ActionType {
    LeftClick;
    RightClick; // this is probably unnecessary for most instal-
        lations.
    Text Input;
    RadioButton;
    Menu;
    Other actions;
    }
    required ActionType input_type;
    // what is input text
    optional string input_data;
}
```

If there is a necessity to test the binary further, binary analysis scanner 305 can decide, for example, to invoke search tester 340 to investigate the impact of the running binary on search results. Taking the VM snapshot and installation info in 504 as an input, search tester 340 can initiate the snapshotted VM with the binary installed and running. After tester 340 starts a browser and navigates to a search site, auto-user 310 can emulate a user typing a search query in the corresponding search box and send an "enter" signal to the search form. Subsequently, tester 340 can store the test results including network request responses, file system, registry and process changes, rendered HTML content and possible DOM objects in search tester protocol buffer 506. Below is an example code snippet of protocol buffer definition of search tester 340:

```
    message SearchTesterResult {
        repeated message SearchQueries search_queries;
    }
    message SearchQuery {
        required string query;
        required string url;
        repeated message DOM results;
    }
    message DOM {
        required string url;
        required string digest;     // digest of the extracted DOM
        content for that URL.
                    // The content will be stored in a
        separate column keyed by the digest.
        // PageComponents
        repeated message PageComponents page_components;
    }
    // this hold info about main components of the page that we
    interacted with.
    message PageComponents {
        enum ComponentType {
        FORM;
        Button;
        DropMenu;
        }
        required ComponentType type;
        optional string label;
        repeated message PageAction actions;
    }
    message PageAction {
        enum ActionType {
        Click;
        InputText;
        Select;
        CheckButton;
        }
        required ActionType action;
        optional string input;
    }
```

Likewise, VM analysis scanner 305 can decide, for example, to invoke spyware tester 350 to detect behavior attributed to spying activities. Similar to the operations performed by search tester 340, spyware tester 350 can take VM snapshot and installation information at 504 as an input, and initiate the snapshotted VM with the binary installed running. After tester 350 starts a browser and navigate to a popular site such as a banking or webmail site, auto-user 310 can emulate a user typing a user name and password to access an account on the website. Accordingly, tester 350 can store the test results including network request responses, file system, registry and process changes, the rendered HTML content and DOM objects in spyware tester protocol buffer 508. Below is an example code snippet of protocol buffer definition of spyware tester 350:

```
message SpyWareTesterResult {
    repeated message LoginTest login_tests;
}
message LoginTest {
    required string url;
    required string user;
    required string pass;
    repeated DOM* results;
}
```

Finally, VM analysis scanner 305 can invoke un-installation tester 360 in the similar fashion to evaluate the process of un-installing the binary using the information collected at the installation phase. In particular, un-installation tester 360 can find the running process associated with the binary and attempt to kill the process in some embodiments. In other embodiments, tester 360 can un-install the binary using uninstaller package. For example, because standard Windows package contains both installer and uninstaller packages whose location can be identified via registry keys, such packages can be utilized for un-installation. In another example, the uninstaller package can be located via the INF files. In the event that uninstaller invokes a pop-up dialog window, auto-user 310 can simulate user interaction through the uninstallation process. Moreover, binary verifier 364 can verify if the un-installation is successful by checking that all files and registry entries associated with the binary have been removed. Consequently, the un-installation test result is stored in the protocol buffer by test result manager 366. Below is an example code snippet of protocol buffer definition for un-installation tester 360:

```
message UnInstallSuiteResult {
    enum Status {
    SUCCESS;
    FAIL;
    }
    required Status status;
    repeated string failure_msgs;
    repeated message UnInstallInfo info;
    repeated message Window windows; // defined above
}
message UnInstallInfo {
    repeated string processes;
    repeated string uninstaller_path;
    repeated string registry_entries;
}
```

While for illustration purpose, testers 330, 340, 350 360 and 370 are discussed above following a certain order, a person skilled in the relevant art given this description would appreciate that any tester described above can be carried out in different orders, independently or in parallel with other testers.

Method

Figure 6:
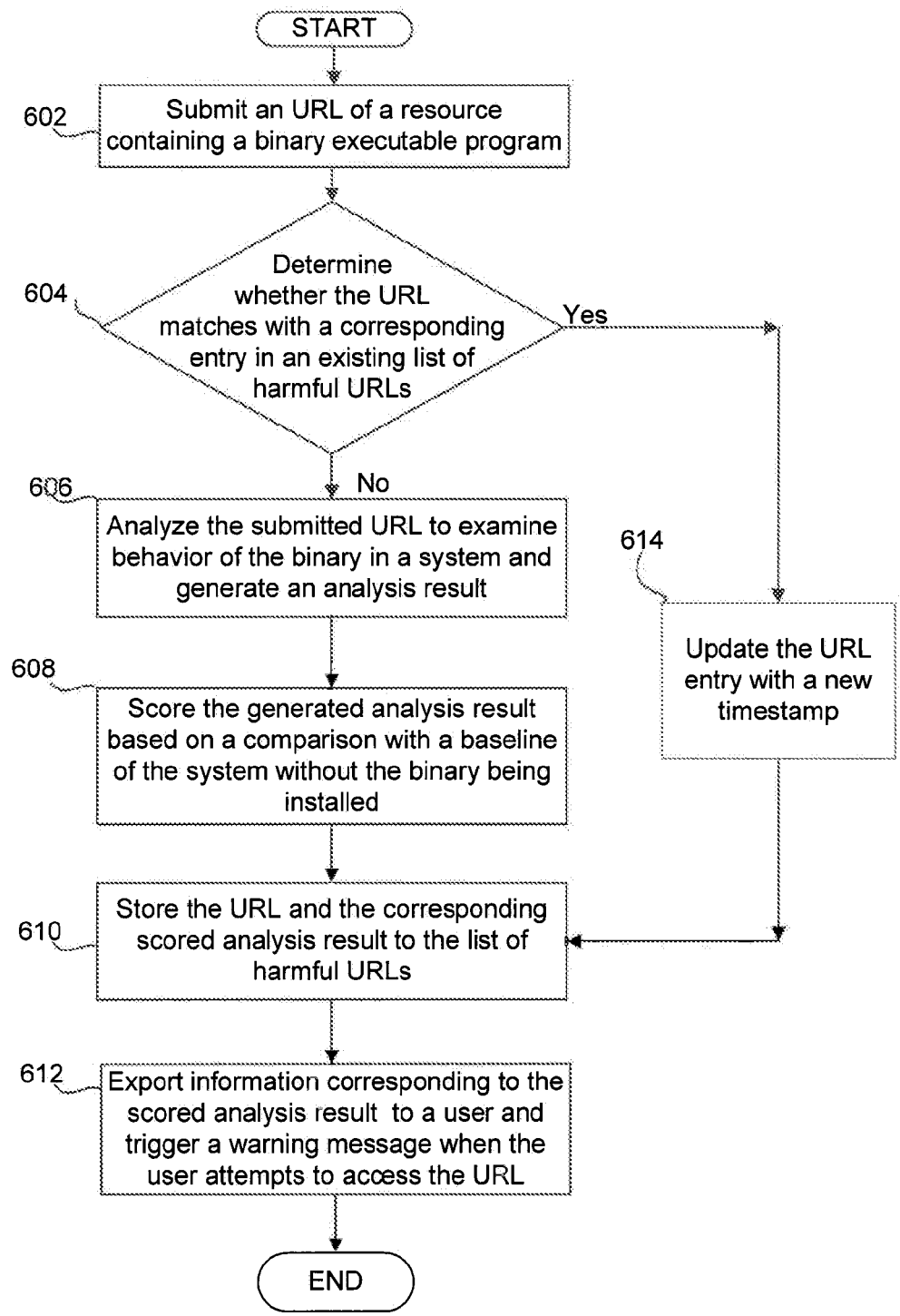
FIG. 6 shows a flowchart illustrating a method for automatically analyzing and predicting behavior of binary executable programs, according to an embodiment.

FIG. 6 shows a flowchart illustrating a method for automatically analyzing and predicting behavior of binary executable programs, according to an embodiment. For ease of explanation, method 600 will be described with respect to system 200 of FIG. 2, as described above. However, method 600 is not intended to be limited thereto.

According to an embodiment, analyzing and predicting method 600 starts with step 602 by submitting an URL representing a resource which contains a binary executable program. For example, the submitting step can be implemented by binary explorer 220 described in FIG. 2 and FIG. 4.

Method 600 proceeds with step 604, where the URL is compared with a pre-existing list of harmful URLs. If a match is found, the pre-existing list is updated with a new timestamp associated with the URL at 614. Step 604 can be implemented by content fetcher 424 of binary explorer 220. Notably, the pre-existing list of harmful URLs can be contained in an I/O files or similar files in a directory. Alternatively, the list can be associated with a table in binary database 140.

In the event that no match is found, method 600 continues to step 606 where the submitted URL is analyzed to examine behavior of the binary in a system such as an analysis VM 320. In some examples, as described in FIG. 3 and FIG. 5, step 606 can be performed by binary analyzer 230. Subsequently, analysis test results such as 504, 506, 508 and 510 can be generated recording changes in network responses, processes, file and registry monitors, HTML content and DOM objects.

At step 608, which can be implemented by result interpreter 240 in FIG. 2, the generated analysis result is scored based on comparison with a baseline of analysis VM 230 before the binary is installed and run on the machine. In some embodiments, there exists a plurality of scorers corresponding to each type of the analysis testers contained in binary analyzer 230. For example, a search result scorer can be implemented to score the analysis result of the search tester. In another example, an anti-virus scorer can be implemented for an anti-virus tester. In still another example, a multi-functional scorer is capable of scoring analysis test result from various types of testers.

According to an embodiment, the scorers can run as a component independent from result interpreter 240. In another embodiment, the scorers can run as a taskmaster client. However, the scorers can share common functionalities such as retrieving the corresponding evaluation or test result from binary database 140 or an I/O file. Furthermore, the scorers can load the baseline information of an analysis VM 230. Finally, the scorers can evaluate and score the analysis result of the binary by measuring the deviation from the baseline.

Below is an example code snippet of protocol buffer definition of an output generated by a scorer, which includes definitions on the URL/content digest, baseline information, scorer type and the resulting score:

```
message Score {
    digest
    baseline replay_case
    repeated message ScoreLogs;
}
message ScoreLog {
    source;
    type;
    infos;
    score;
}
```

Proceeded with step 610, the URL of the binary, its content and the relevant scored analysis result are stored to the list of the potentially harmful URLs. As described above, the list can be located in a flat file or a table in a database. A skilled person in the relevant art would appreciate that step 610 can be implemented by result interpreter 240, or any other component independent from result interpreter 240.

Although step 612 can be implemented by data reporter 250, it is not limited by the system described in FIG. 2. When a user attempts to access the URL which has been scored and stored, the analysis result pertinent to the URL can be exported at step 612. For example, a new list of URL patterns similar to a phising/malware list can be created and exported to the user. In another example, when a match to a URL in the list is detected, a warning message can be invoked directing the user to a diagnostic page displaying scored analysis result pertaining to the URL. In still another example, the scored analysis report can be exported when the content or digest that the user attempts to download matches with a corresponding record in a predefined list or database.

Example Computer System Implementation

Embodiments shown in FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

Figure 7:
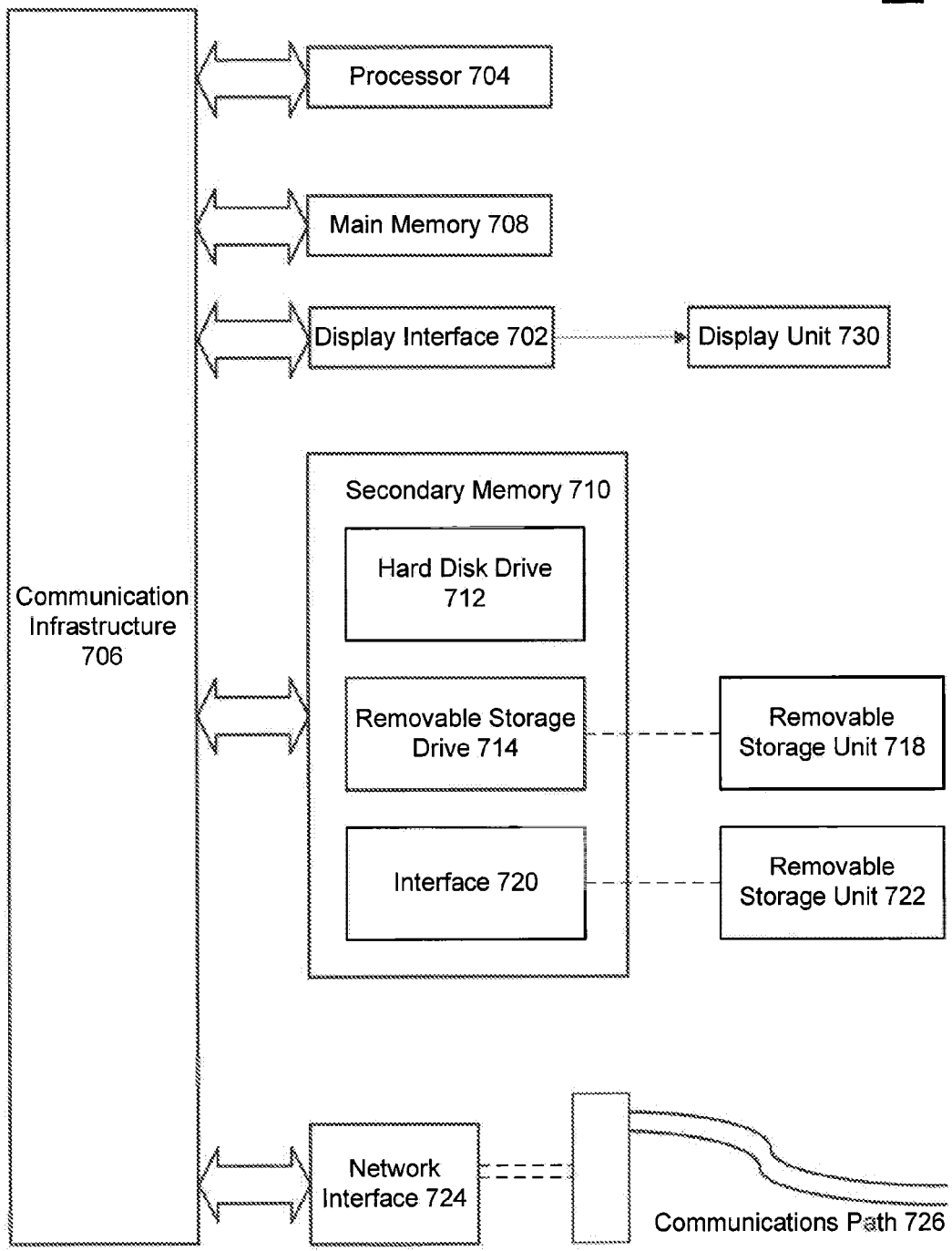
FIG. 7 is a diagram of an example computer system in which embodiments can be implemented.

FIG. 7 illustrates an example computer system 700 in which embodiments, or portions thereof, may be implemented as computer-readable code. For example, binary exploration system 135, including its components, as shown in FIGS. 1 and 2 can be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-2.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, removable storage drive 714. Removable storage drive 714 may comprise a floppy disk drive, a magnetic tape drive, an optical disk drive, a flash memory, or the like. The removable storage drive 714 reads from and/or writes to a removable storage unit 718 in a well-known manner. Removable storage unit 718 may comprise a floppy disk, magnetic tape, optical disk, etc. which is read by and written to by removable storage drive 714. As will be appreciated by persons skilled in the relevant art, removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a network interface 724. Network interface 724 allows software and data to be transferred between computer system 700 and external devices. Network interface 724 may include a modem, a network interface (such as an Ethernet card), a communications port, a PCMCIA slot and card, or the like. Software and data transferred via network interface 724 may be in the form of signals, which may be electronic, electromagnetic, optical, or other signals capable of being received by network interface 724. These signals may be provided to network interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to tangible, non-transitory media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via network interface 724. Such computer programs, when executed, enable computer system 700 to implement embodiments as discussed herein. In particular, the computer programs, when executed, enable processor device 704 to implement the processes of embodiments of the present invention, such as the stages in the methods illustrated by flowchart 600 of FIG. 6, discussed above. Accordingly, such computer programs represent controllers of the computer system 700. Where embodiments are implemented using software, the software may be stored in a computer program product and loaded into computer system 700 using removable storage drive 714, interface 720, and hard disk drive 712, or network interface 724.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

Variations

As would be understood by a person skilled in the art based on the teachings herein, several variations of the above described features of automatic behavior analysis and prediction of binary executable programs. These variations are within the scope of embodiments of the present invention. For the purpose of illustration only and not limitation, a few variations are provided herein.

In an example, one skilled in the art can envision several variations to the example code snippets, as described above. In an embodiment, a different program syntax may be used in place of the protocol definition described above. For example, any well-known programming language generally used by those skilled in the relevant art for writing software programs may also be used to define the buffer protocols for various testers and output prototype structure of the scorers.

In another example of a variation, embodiments of the binary analysis testers in FIGS. 3 and 5, as described herein may be further configured to run in parallel. Such parallel execution of these testers would greatly increase the efficiency and speed of analysis phase of the binary exploration system.

CONCLUSION

The Summary and Abstract sections may set forth one or more but not all embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described embodiments, but should be defined only in accordance with the following claims and their equivalents.

What is claimed is:

1. A computer-implemented method for automatically analyzing and predicting behavior of a binary executable program, the method comprising:

receiving an uniform resource locator addressing the binary executable program to be analyzed;

identifying a plurality of testers based on one or more task requirements of the binary executable program, wherein each tester is associated with a unique task;

for each identified tester:
running an analysis virtual machine without the binary executable program being installed,
taking a snapshot of the analysis virtual machine to generate a replay base case describing parameters of the analysis virtual machine once the analysis virtual machine is run without the binary executable program being installed in the analysis virtual machine,
running the binary executable program installed in the analysis virtual machine to simulate interaction of the binary executable program with a computing device,
automatically recording, by the identified tester, safety information describing interaction that occurred between the binary executable program and the analysis virtual machine when the binary executable program was run in the analysis virtual machine, and
determining whether the binary executable program is unsafe based on the safety information generated by the analysis virtual machine by:
comparing the safety information of the binary executable program to be analyzed with the replay base case,
identifying a scorer that is associated with the identified tester, and
scoring, by the identified scorer, the safety information of the binary executable program to be analyzed based on the comparison, wherein the receiving, the running, the recording, and the determining are performed by one or more computing devices.

2. The computer-implemented method of claim 1, further comprising:
maintaining a binary database including safety information for each of a plurality of known executable programs; and wherein the determining whether the binary executable program is unsafe further comprises comparing the binary executable program to be analyzed with the known executable programs in the binary databases.

3. The computer-implemented method of claim 1, wherein the recording further comprises:
recording safety information of describing an impact of the binary executable program on search result executed by the analysis virtual machine.

4. The computer-implemented method of claim 1, further comprising:
installing the binary executable program to the analysis virtual machine; and
taking a snapshot of the analysis virtual machine after the installation of the binary executable program.

5. The computer-implemented method of claim 4, wherein the recording further comprises:
recording safety information describing changes on parameters of the analysis virtual machine attributed to spying activities.

6. The computer-implemented method of claim 4, further comprising:
uninstalling the binary executable program from the analysis virtual machine; and
taking a snapshot of the analysis virtual machine after the uninstallation of the binary executable program.

7. The computer-implemented method of claim 1, further comprising:
simulating and automating interaction of a human user with the analysis virtual machine via an auto-user.

8. The computer-implemented method of claim 1, further comprising:
selecting the binary executable program to be analyzed based on a content based feature of the binary executable program.

9. A system for automatically analyzing and predicting behavior of a binary executable program, comprising:
a binary explorer, implemented by one or more computing devices, configured to receive an uniform resource locator addressing the binary executable program to be analyzed;
a binary analyzer, implemented by one or more computing devices, configured to:
run the binary executable program installed in an analysis virtual machine to simulate interaction of the binary executable program on a computing device, wherein the analysis virtual machine comprises a plurality of testers that are each associated with a unique task,
automatically record, by each identified tester, safety information describing interaction that occurred between the binary executable program and the analysis virtual machine when the binary executable program was run in the analysis virtual machine; and
a result interpreter, implemented by one or more computing devices, configured to determine whether the binary executable program is unsafe based on the safety information generated by the analysis virtual machine, wherein the result interpreter comprises a plurality of scorers, wherein each scorer is associated with one of the identified testers, implemented by one or more computing devices, configured to:
take a snapshot of the analysis virtual machine to generate a replay base case describing parameters of the virtual machine without the binary executable program being installed in the analysis virtual machine;
compare the safety information of the binary executable program to be analyzed with the replay base case of the analysis virtual machine; and
score the information of the binary executable program to be analyzed based on the comparison.

10. The system of claim 9, wherein the result interpreter is further configured to:
compare the binary executable program to be analyzed with each of a plurality of known executable programs in a binary database, wherein the binary database contains safety information describing the interaction of the known executable programs with a computing device.

11. The system of claim 9, further comprising:
a data reporter, implemented by one or more computing devices, configured to present the safety information to a user to trigger a warning message based on a match between the binary executable program to be analyzed and an entry of known executable programs in a binary database, wherein the binary database contains safety information describing the interaction of the known executable programs with a computing device.

12. The system of claim 9, wherein the plurality of testers comprises a binary installation tester, configured to:
   install the binary executable program to the analysis virtual machine; and
   take a snapshot of the analysis virtual machine after the installation of the binary executable program.

13. The system of claim 9, wherein the plurality of testers comprises a search tester, configured to record safety information describing an impact of the binary executable program on search result executed in the analysis virtual machine.

14. The system of claim 9, wherein the plurality of testers comprises a spyware tester, configured record safety information describing changes on parameters of the analysis virtual machine attributed to spying activities.

15. The system of claim 9, wherein the plurality of testers comprises an uninstallation tester, configured to:
   uninstall the binary executable program from the analysis virtual machine; and
   take a snapshot of the analysis virtual machine after the uninstallation of the binary executable programs.

16. The system of claim 9, wherein the analysis virtual machine comprises an auto-user, configured to simulate and automate interaction of a human user with the analysis virtual machine.

17. The system of claim 9, further comprising:
   a pre-filter, implemented by one or more computing devices, configured to filter the binary executable program to be analyzed based on a content based feature of the binary executable program;
   a content fetcher, implemented by one or more computing devices, configured to fetch content of the binary executable program; and to store as a record in a binary database; and
   a task submitter, implemented by one or more computing devices, configured to submit and prioritize tasks associated with the fetched content to the analysis virtual machine to be analyzed based on a metadata of the record.

18. A non-transitory computer-readable medium storing software comprising instructions executable by one or more computers which, upon such execution, cause the one or more computers to perform operations comprising:
   receiving an uniform resource locator addressing the binary executable program to be analyzed;
   identifying a plurality of testers based on one or more task requirements of the binary executable program, wherein each tester is associated with a unique task;
   for each identified tester:
      running an analysis virtual machine without the binary executable program being installed;
      taking a snapshot of the analysis virtual machine to generate a replay base case describing parameters of the analysis virtual machine once the analysis virtual machine is run without the binary executable program being installed in the analysis virtual machine;
      running the binary executable program installed in the analysis virtual machine to simulate interaction of the binary executable program with a computing device;
      automatically recording, by the identified tester, safety information describing interaction that occurred between the binary executable program and the analysis virtual machine when the binary executable program was run in the analysis virtual machine; and
      determining whether the binary executable program is unsafe based on the safety information generated by the analysis virtual machine by, for each of the identified testers:
         comparing the safety information of the binary executable program to be analyzed with the replay base case,
         identifying a scorer that is associated with the identified tester, and
         scoring, by the identified scorer, the safety information of the binary executable program to be analyzed based on the comparison.

* * * * *